(12) United States Patent
Fenney et al.

(10) Patent No.: US 11,830,144 B2
(45) Date of Patent: Nov. 28, 2023

(54) FRUSTUM RENDERING IN COMPUTER GRAPHICS

(71) Applicant: Imagination Technologies Limited, Kings Langley (GB)

(72) Inventors: Simon Fenney, St. Albans (GB); Michael Worcester, Hemel Hempstead (GB); Stuart Smith, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 18/099,075

(22) Filed: Jan. 19, 2023

(65) Prior Publication Data

US 2023/0162444 A1    May 25, 2023

Related U.S. Application Data

(63) Continuation of application No. 17/675,791, filed on Feb. 18, 2022, now Pat. No. 11,587,290, which is a continuation of application No. 17/133,022, filed on Dec. 23, 2020, now Pat. No. 11,295,524, which is a continuation of application No. 16/659,388, filed on Oct. 21, 2019, now Pat. No. 10,878,626, which is a (Continued)

(30) Foreign Application Priority Data

Feb. 1, 2016 (GB) ..................... 1601767

(51) Int. Cl.
*G06T 17/20* (2006.01)
*G06T 15/30* (2011.01)
*G06T 11/40* (2006.01)
*G06T 1/20* (2006.01)
*G06T 15/00* (2011.01)
*G06T 15/04* (2011.01)
*G06T 15/60* (2006.01)

(52) U.S. Cl.
CPC ............... *G06T 17/20* (2013.01); *G06T 1/20* (2013.01); *G06T 11/40* (2013.01); *G06T 15/005* (2013.01); *G06T 15/04* (2013.01); *G06T 15/30* (2013.01); *G06T 15/60* (2013.01); *G06T 2200/04* (2013.01)

(58) Field of Classification Search
CPC ..................................................... G06T 17/20
See application file for complete search history.

(56) References Cited

U.S. PATENT DOCUMENTS 10,489,974 B2   11/2019   Fenney et al.
2003/0021491 A1  1/2003   Brust
(Continued)

OTHER PUBLICATIONS

Bittner et al., "Shadow Caster Culling for Efficient Shadow Mapping," Symposium on Interactive 3D Graphics and Games, Feb. 18, 2001, pp. 81-88.

(Continued)

*Primary Examiner* — Shivang I Patel
(74) *Attorney, Agent, or Firm* — Potomac Law Group, PLLC; Vincent M DeLuca

(57) ABSTRACT

A graphics processing system includes a tiling unit configured to tile a first view of a scene into a plurality of tiles, a processing unit configured to identify a first subset of the tiles that are associated with regions of the scene that are viewable in a second view, and a rendering unit configured to render to a render target each of the identified tiles.

20 Claims, 7 Drawing Sheets

Related U.S. Application Data continuation of application No. 15/421,647, filed on Feb. 1, 2017, now Pat. No. 10,489,974.

(56) References Cited

U.S. PATENT DOCUMENTS

| | | | |
|---|---|---|---|
| 2011/0254852 A1 | 10/2011 | Howson | |
| 2013/0321411 A1 | 12/2013 | Pahwa et al. | |
| 2013/0328873 A1* | 12/2013 | Harada | G06T 15/506 345/422 |
| 2014/0092087 A1* | 4/2014 | Kazama | H04N 1/642 345/420 |
| 2015/0317825 A1 | 11/2015 | Hazel | |
| 2016/0093098 A1* | 3/2016 | Andersson | G06T 15/60 345/426 |
| 2016/0148419 A1* | 5/2016 | Ahn | G06T 15/506 345/426 |

OTHER PUBLICATIONS

Martin et al., "Anti-Aliasing and Continuity with Trapezoidal Shadow Maps," Eurographics Symposium on Rendering, Jan. 1, 2004, 9 pages.

Rohmer et al., "Tiled Frustum Culling for Differential Rendering on Mobile Devices," 2015 IEEE Int'l Symposium on Mixed and Augmented Reality, Sep. 29, 2015, pp. 37-42.

Giegl et al., "Fitted virtual shadow maps", Proceedings of the Candian Information Processing Society on Graphics Interface 2005, May 28, 2007, pp. 159-168, Victoria, British Columbia.

Scherzer et al., "A Survey of Real-Time Hard Shadow Mapping Methods," Computer Graphics Forum, vol. 30, No. 1; Mar. 17, 2011, pp. 169-186.

Scherzer, "Shadow Mapping of Large Environments", Diplomarbeit—Computergraphik und Algorithmen det T.U. Wien, Feb. 16, 2006, URL:http://citeseerx.ist.psu.edu/viewdoc/download?doi=10.1.1.231.619&rep=rep1&type=pdf pp. 1-95.

(Note:NPL in parent apns).

* cited by examiner

FRUSTUM RENDERING IN COMPUTER GRAPHICS

CROSS-REFERENCE TO RELATED APPLICATIONS AND CLAIM OF PRIORITY

This application is a continuation under 35 U.S.C. 120 of copending application Ser. No. 17/675,791 filed Feb. 18, 2022, which is a continuation of prior application Ser. No. 17/133,022 filed Dec. 23, 2020, now U.S. Pat. No. 11,295,524, which is a continuation of prior application Ser. No. 16/659,388 filed Oct. 21, 2019, now U.S. Pat. No. 10,878,626, which is a continuation of prior application Ser. No. 15/421,647 filed Feb. 1, 2017, now U.S. Pat. No. 10,489,974, which claims foreign priority under 35 U.S.C. 119 from United Kingdom Application No. 1601767.5 filed Feb. 1, 2016.

BACKGROUND OF THE INVENTION

This invention relates to systems and methods for graphics processing.

In a 3D graphics processing system, objects of a scene are represented with groups of primitives, which are typically projected, scan converted, textured, and shaded during rendering of the scene. A primitive has a simple geometric shape, often a triangle, defined by the positions of one or more vertices (e.g. three vertices in the case that the primitive is a triangle) to which a texture can be applied. The rendering of a 3D scene processes the primitives to form an image comprising an array of image pixels.

During rendering of a scene, a graphics processing unit (GPU) fetches texture data, which is stored in memory, to apply texture to objects in the scene. This transfer of data between the GPU and the memory utilises significant memory bandwidth and consumes power. Furthermore, large textures require a large amount of memory to be allocated to them, which can lead to a shortage of memory for use by other applications.

An example of a large texture is a shadow map, which is used to add shadows to a scene. The basic principle of shadow mapping is to render a scene from the point of view of a light source for the scene (such as the sun) and to store the depth of every surface that is visible (i.e. every surface that is lit by the light source). Next, the regular scene (from the camera's point of view) is rendered and the depth of every point drawn is compared to the stored depths to determine if the drawn point is in front of or behind the stored depth from the point of view of the light source. If the depth of a point is behind a lit surface, then that point is in shadow. Otherwise, it is lit. The depth information is stored as a texture (i.e. as a shadow map), which requires a large amount of memory, especially for high resolution shadow maps. Generating and storing a high resolution shadow map requires significant processing power, a large amount of memory and a high memory bandwidth. As the transfer of data between memory and the GPU is a significant cause of power consumption, reductions that are made in this area will allow the GPU to operate at lower power. Additionally, any reductions in memory bandwidth use and the hardware optimisations associated with it can boost application performance.

There is, therefore, a need to reduce memory and processing overheads in a graphics processing system.

BRIEF SUMMARY OF THE INVENTION

According to a first aspect of the present invention there is provided a graphics processing system comprising: a tiling unit configured to tile a first view of a scene into a plurality of tiles; a processing unit configured to identify a first subset of the tiles that are associated with regions of the scene that are viewable in a second view; and a rendering unit configured to render to a render target each of the identified tiles.

The regions of the scene that are viewable in the second view may be a view frustum of the second view; and the first subset of tiles may be identified in dependence on determining the position of the view frustum of the second view from the first view.

The first subset of tiles may be identified in dependence on a frustum model comprising primitives representing a view frustum of the second view.

The tiling unit may be configured to tile the frustum model from the first view into the plurality of tiles and generate a list of frustum primitives associated with each of the tiles; and the processing unit may be configured to identify the first subset of tiles in dependence on the list of frustum primitives, each of the first subset of tiles being associated with at least a predetermined number of frustum primitives.

The processing unit may be configured to identify a second subset of tiles of the first view that are associated with at least one object in the scene. The rendering unit may be configured to render each of the tiles that are identified in both the first and second subset.

The tiling unit may be configured to tile the at least one object in the scene from the first view into the plurality of tiles to generate a list of object primitives associated with each of the tiles. The processing unit may be configured to identify the second subset of tiles in dependence on the list of object primitives for the first view, each of the second subset of tiles being associated with at least a predetermined number of object primitives.

The predetermined number may be equal to or greater than one.

The processing unit may be configured to: identify primitives that are further, from a point of view for the first view, than a or the view frustum for the second view; and clip the identified primitives from the scene, wherein the first view is a view of the clipped scene.

The render target may be a texture. The rendering unit may be configured to apply the texture to the scene in a subsequent render of the scene. The texture may be applied to the second view of the scene, the second view being different to the first view. The texture may be a shadow map.

According to a second aspect of the present invention there is provided a graphics processing method comprising: tiling a first view of a scene into a plurality of tiles; identifying a first subset of the tiles that are associated with regions of the scene that are viewable in a second view; and rendering to a render target each of the identified tiles.

The regions of the scene that are viewable in the second view may be a view frustum of the second view; and the first subset of tiles may be identified in dependence on determining the position of the view frustum of the second view from the first view.

The first subset of tiles may be identified in dependence on a frustum model comprising primitives representing a view frustum of the second view.

Tiling the first view may comprise tiling the frustum model from the first view into the plurality of tiles, and generating a list of frustum primitives associated with each of the tiles. Identifying the first subset may comprise identifying the first subset of tiles in dependence on the list of frustum primitives, each of the first subset of tiles being associated with at least a predetermined number of frustum primitives.

The method may further comprise identifying a second subset of tiles of the first view that are associated with at least one object in the scene, wherein the rendering step comprises rendering tiles that are identified in both the first and second subset.

Tiling the first view may comprise tiling the at least one object in the scene from the first view into the plurality of tiles, and generating a list of object primitives associated with each of the tiles, and wherein the second subset of tiles may be identified in dependence on the list of object primitives for the first view and each of the second subset of tiles are associated with at least a predetermined number of object primitives.

The predetermined number may be equal to or greater than one.

The method may further comprise: identifying primitives that are further, from a point of view for the first view, than a or the view frustum for the second view; and clipping the identified primitives from the scene, wherein the first view is a view of the clipped scene.

The render target may be a texture. The method may further comprise applying the texture to the scene in a subsequent render of the scene. The texture may be applied to the second view of the scene, the second view being different to the first view. The texture may be a shadow map.

There is provided a graphics processing system configured to perform any of the methods described above.

The graphics processing systems described above may be embodied in hardware on an integrated circuit.

There is provided a method of manufacturing, at an integrated circuit manufacturing system, the graphics processing system described above.

There is provided an integrated circuit definition dataset that, when processed in an integrated circuit manufacturing system, configures the manufacturing system to manufacture the graphics processing system described above.

There is provided a non-transitory computer readable storage medium having stored thereon an integrated circuit definition dataset that, when processed in an integrated circuit manufacturing system, configures the manufacturing system to manufacture the graphics processing system described above.

There is provided an integrated circuit manufacturing system comprising: a non-transitory computer readable storage medium having stored thereon a computer readable integrated circuit description that describes a graphics processing system; a layout processing system configured to process the integrated circuit description so as to generate a circuit layout description of an integrated circuit embodying the graphics processing system; and an integrated circuit generation system configured to manufacture the graphics processing system according to the circuit layout description, wherein the graphics processing system comprises: a tiling unit configured to tile a first view of a scene into a plurality of tiles; a processing unit configured to identify a first subset of the tiles that are associated with regions of the scene that are viewable in a second view; and a rendering unit configured to render to a render target each of the identified tiles.

There is provided computer program code for performing any of the methods described above.

There is provided a non-transitory computer readable storage medium having stored thereon computer readable instructions that, when executed at a computer system, cause the computer system to perform any of the methods described above.

BRIEF DESCRIPTION OF THE DRAWINGS

The present invention will now be described by way of example with reference to the accompanying drawings. In the drawings.

DETAILED DESCRIPTION OF THE INVENTION

The following description is presented by way of example to enable a person skilled in the art to make and use the invention. The present invention is not limited to the embodiments described herein and various modifications to the disclosed embodiments will be apparent to those skilled in the art.

The following examples describe systems and methods for generating a shadow map and using that shadow map to apply shadows to a scene. The systems and methods, however, can be used in any situation where a scene is rendered to a texture.

As mentioned above, generation of large textures such as shadow maps requires a large amount of memory for storing the texture and a high memory bandwidth for transferring the texture data to the memory. A high memory bandwidth is also required when a GPU fetches the stored texture data to apply it to a scene. The following describes a tile-based graphics system that is capable of reducing these processing, memory and memory bandwidth requirements. Broadly, one way of achieving this is by sub-dividing a scene in to a plurality of tiles and identifying a particular subset of tiles that have a number of primitives in them and rendering only those tiles to a texture. The tiles that are not identified are ignored and not rendered. By rendering only a particular subset of tiles, memory and processing overheads can be reduced compared to rendering all of the tiles that make up the whole scene. This is particularly efficient for textures such as shadows maps, which have large memory requirements but usually only cover relatively small areas of a scene.

Figure 1:
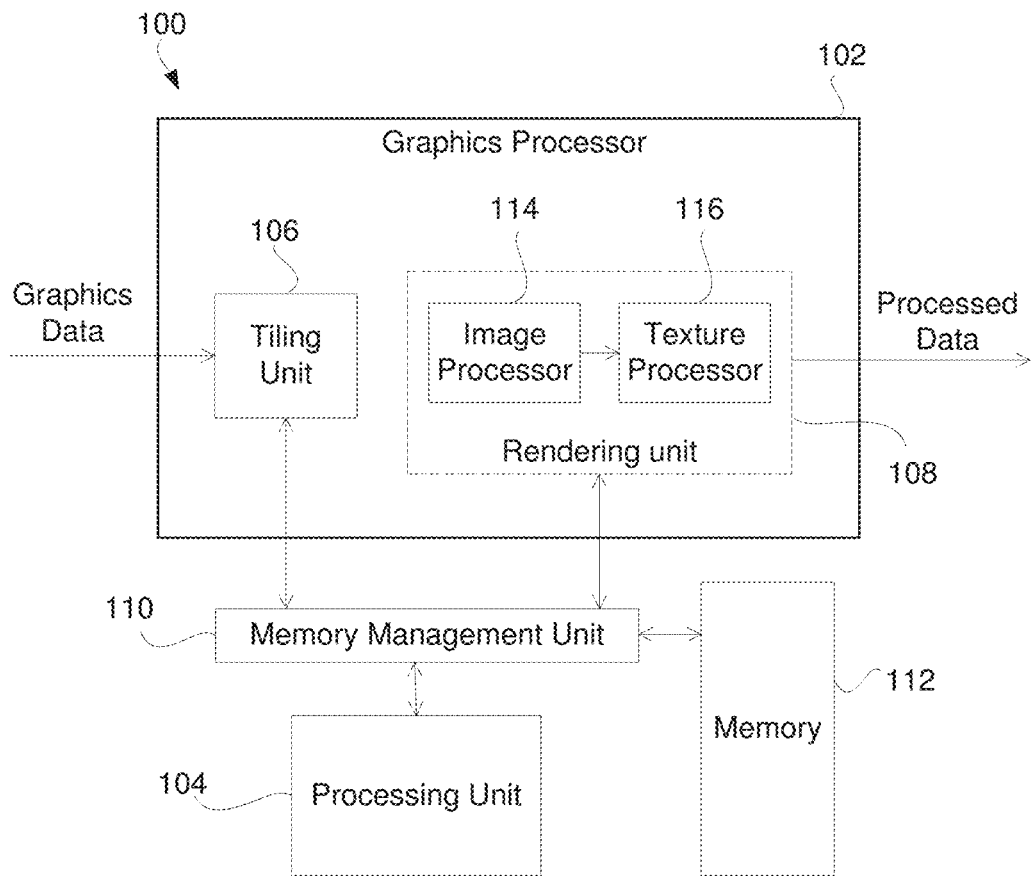
FIG. 1 shows a tile-based graphics system.

FIG. 1 is a schematic diagram showing a tile-based graphics system 100. The system 100 may be implemented on a device, such as a smart phone, tablet, laptop, Personal Computer (PC), television, or any other appropriate device in which graphics data is to be processed. The tile-based graphics system 100 is configured to receive data, e.g. from an application, process the data and provide an output of processed data. The system 100 comprises a graphics processor 102 which is configured to process the data. The graphics processor 102 may be implemented in hardware or software, or a combination thereof. For example, the graphics processor 102 may be implemented in fixed-function hardware comprising circuits configured to process data accordingly as described herein. For example, the processor 102 may be a Graphics Processing Unit (GPU), or may be implemented as a computer program running on a programmable device such as a GPU or a Central Processing Unit (CPU).

The graphics processor 102 comprises a plurality of functional blocks for processing data, wherein some (but, for clarity, not all) of the functional blocks of the graphics processor 102 are shown in FIG. 1. In particular, the graphics processor 102 comprises a tiling unit 106 and a rendering unit 108. The rendering unit 108 may comprise an image processor 114 and a texture processor 116.

The system 100 also comprises a processing unit 104 which is configured to process data. Processing unit 104 may be implemented in hardware or software, or a combination thereof. For example, the processing unit 104 may be implemented in fixed-function hardware comprising circuits configured to process data accordingly as described herein. For example, the processor 104 may be a general purpose Central Processing Unit (CPU), or may be implemented as a computer program running on a programmable device such as a GPU or a Central Processing Unit (CPU).

The system 100 comprises a memory 112 which is arranged to communicate with the graphics processor 102 and processing unit 104. The memory 112 may comprise a plurality of memory blocks (not shown) for storing data. The system 100 may also comprise a memory management unit (MMU) 110 which is configured to manage the memory resources of memory 112. The MMU 110 may perform virtual memory management and translate virtual memory addresses to physical addresses. The MMU 110 may be implemented as part of the processing unit 104 or as a separate hardware component or as a computer program. The graphics processor 102 may comprise a cache (not shown), which may be used to fetch and temporarily store data from the memory 112.

In operation, the graphics processor 102 is arranged to receive graphics data, e.g. from an application which is currently running on the device on which the system is implemented. The graphics data comprises geometry data which defines objects for display. The tiling unit 106 includes logic for implementing a number of functions in the graphics processor 102. For example, the tiling unit 106 receives the geometry data and derives a plurality of primitives from the geometry data. The tiling unit 106 also tiles the primitives into a plurality of tiles by sorting the primitives into per-tile lists. Some processing to the geometry data may, or may not, be performed by the graphics processor 102 (in functional blocks which are not illustrated in FIG. 1) before the tiling unit 106 receives the geometry data. The primitives represent geometrical objects or other geometry. Parameters describing the primitives are stored in memory 112. The stored parameters describe multiple primitives which may be located in multiple tiles. The primitives are often polygons, such as triangles, but may have other forms, such as lines, points or patches. The stored parameters represent the location of the primitives (e.g. the location of vertices forming the primitives for example in screen space coordinates). The parameters may also indicate other features of the objects or geometry.

The tiling unit 106 tiles a view of a scene into a plurality of screen space tiles by sorting the primitives representing the scene into per-tile lists. The tiling unit 106 determines which primitives are present within each of the tiles of the screen space and creates a list for each tile which indicates which primitives are present within each tile. A primitive may be present in multiple tiles and so that primitive will be indicated in the tile lists for those multiple tiles. A primitive that is present in a single tile will only be listed in the list for that tile.

The screen space is divided into a plurality of tiles. The tiles may be rectangular (including square), but they could be other shapes such as triangular or hexagonal. Tiles can be various sizes, for example tiles may be 32×32 pixels. In one example of an ultra-high definition screen resolution image there are 3,840×2,160 pixels. Therefore, as an example, an ultra-high screen resolution image may be tiled into 8100 tiles (each comprising 32×32 pixels). The screen space may correspond to an image for display on a screen or other render targets such as texture data to be stored in memory.

Figure 2A:
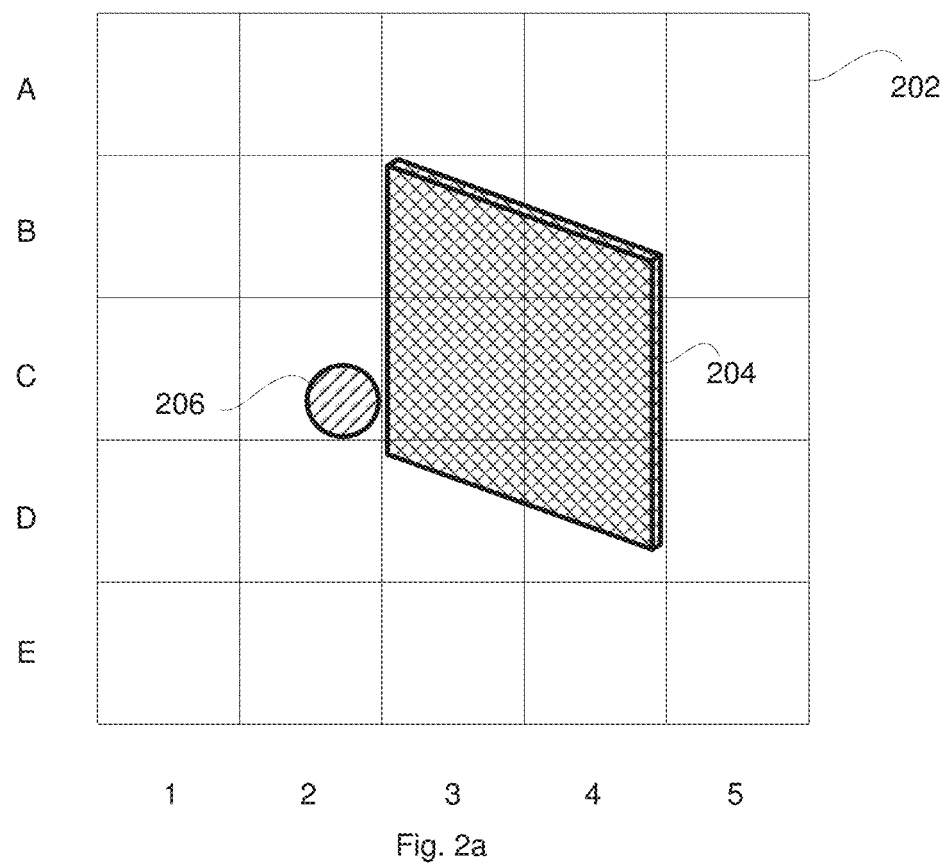
FIG. 2a represents objects in a scene in a tile-based graphics system.

FIG. 2a is a simplified representation of a screen space 202 of a tile-based graphics system comprising twenty-five tiles, arranged in a 5×5 array. Within the screen space 202 shown are two objects: a rectangular wall 204 and a sphere 206. The wall 204 and sphere 206 are made up of a number of primitives (which are not shown for clarity). It can be seen that the wall 204 overlaps with six tiles of the screen space 202: tiles with grid references B3, B4, C3, C4, D3 and D4. Where it is not explicitly stated, the term "overlap" used herein is to be understood to mean "at least partially overlap". The primitives that make up wall 204 overlap six tiles of screen space 202. It can be seen that sphere 206 overlaps with just one of the tiles (grid reference C2) of screen space 202. Thus the primitives that make up the sphere overlaps with just one tile (C2) of the screen space. There will usually be other objects in the scene but these are not shown in FIG. 2 for clarity.

For each tile of the screen space 202, the tiling unit 106 determines whether each primitive is located at least partially within that tile. That is, the tiling unit 106 determines whether at least part of the primitive is located within a viewable region of the tile. This can be done using a number of well-known techniques. In this way, the tiling unit 106 derives a display list, for each tile (tiles A1 to E5), which indicates the primitives which are located either partially or wholly within the tile. The display list for a tile may be a list of references to memory locations of the parameters for the primitives that are at least partially overlapping with the tile. This can save on duplication when a primitive is in more than one tile. The display lists for the tiles may also duplicate primitive parameters where the primitive is in more than one tile, so that the per-tile lists are lists of parameters, rather than lists of references. It is also possible to combine the methods, storing references to some parameters and duplicating others. In the example of FIG. 2a, it can be seen that the display list will indicate that, for tile C2, all of the primitives that make up the sphere 206 will be located in that tile. The display list will also indicate, for each of tiles B3, B4, C3, C4, D3 and D4, the primitives that make up the wall and are located at least partially in each respective tile. The remaining tiles (i.e. tiles A1 to A5, B1, B2, B5, C1, C2, C5, D1, D2, D5 and E1 to E5) will have no primitives listed against them.

The display lists are provided from the tiling unit 106 to the memory 112 for storage therein. When the rendering unit 108 renders a tile it retrieves the display list for that tile from memory 112 and uses the display list to determine which primitives are at least partially overlapping with that tile.

The rendering unit 108 may comprise an image processor 114, which may process a tile to, for example, determine which primitives or parts of primitives are required to be processed further by subsequent processing blocks, such as the texture processor 116. For example, when rendering the image to be displayed, the image processor 114 may determine which primitive parts are visible and removes primitive parts which will not affect the rendered image before the texture processor 116 processes the tiles. So that the image processor 114 can process the primitives within a tile, the primitives (or parameters for those primitives) included in the tile's display list are read from memory 112 for use in processing the tile, e.g. to determine if primitives are visible or not.

The texture processor 116 processes the tiles to apply texturing to the objects that are visible within the tile. An output from the image processor 114 is provided to the texture processor 116 which indicates which of the primitives or parts of primitives the texture processor 116 will need in order to process the tiles. So that the texture processor 116 can process the primitives within a tile, the parameters for the primitives indicated in the output from the image processor 114 may be obtained directly from the image processor 114 or fetched from the memory 112. Some or all of the parameters used by the texture processor 116 for processing a tile may be different to those used by the image processor 114 for processing the same tile. For example the parameters used by the image processor 114 may relate to the location of primitives, whereas the parameters used by the texture processor 116 may, additionally or alternatively, relate to the texture data to be applied to primitives. The texture processor 116 reads the parameters from memory 112 for use in processing the tile, e.g. for implementing the texturing. The parameters may include indications of textures (or specific texels from textures) that are to be applied to objects by the texture processor 116.

The output from the texture processor 110 may be passed to further processing blocks (not shown in FIG. 1) within the graphics processor 102 before being output from the graphics processor 102, e.g. to a display buffer for display on a screen of the device on which the system 100 is implemented or another render target such as texture data in memory.

The system of FIG. 1 may be used to add certain effects, such as shadows, reflections, etc, to a scene, such as the scene in FIG. 2a. This may involve processing data within a scene in a certain way to generate those effects. One method of adding shadows to a scene is by, for example, generating a shadow map and using that shadow map to determine which areas of a scene should be in shadow. Steps 1 and 2 below generally describe how a shadow map is generated and used to apply shadow to a scene. The scene in FIG. 2a, which has a single light source, is used as an example in the described steps.

Step 1: Render a Scene from the Point of View of a Light Source to Generate a Shadow Map.

A conventional render to a render target such as a display buffer would output an image where the pixel values are colours. This render, however, outputs an 'image' where the pixel values are depths and is output to a texture. This render output is the shadow map. A conventional render usually processes depth values using a Z (or depth) buffer in order to perform hidden surface removal, before going on to output a colour for each pixel. The process of rendering a shadow map stops after producing the Z buffer, and outputs that instead. At the end of the render, the Z buffer contains the depth (distance from the camera, or from the light source in this case) of the object that was found to be closest to the camera (or light source).

When primitives overlap (e.g. when the ball 206 overlaps with some of the wall 204), a part of a primitive may be visible rather than all of it. Parts of a primitive are often referred to as "fragments". Fragments may be generated at each sample point (e.g. at each pixel), and so may have an (X,Y) position and a depth. In systems that resolve visibility in the image processor 114, every fragment corresponds to a visible part of an object. A shadow map may be written to a texture from the positions and depths of these visible fragments.

Figure 2B:
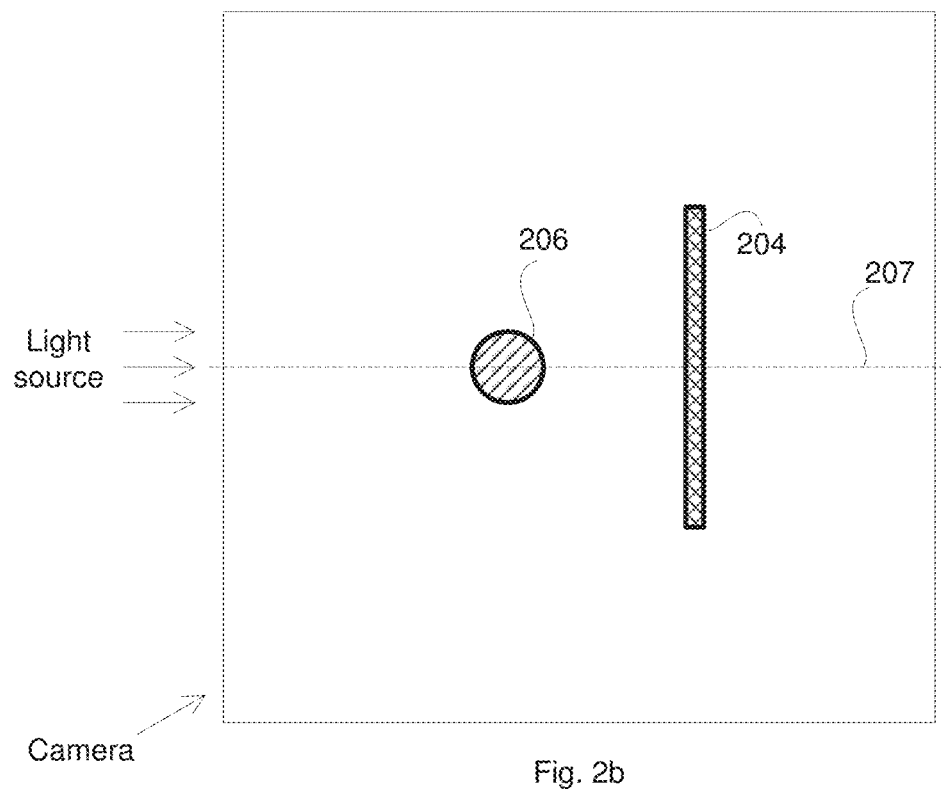
FIG. 2b shows a top-down view of the scene.
Figure 2C:
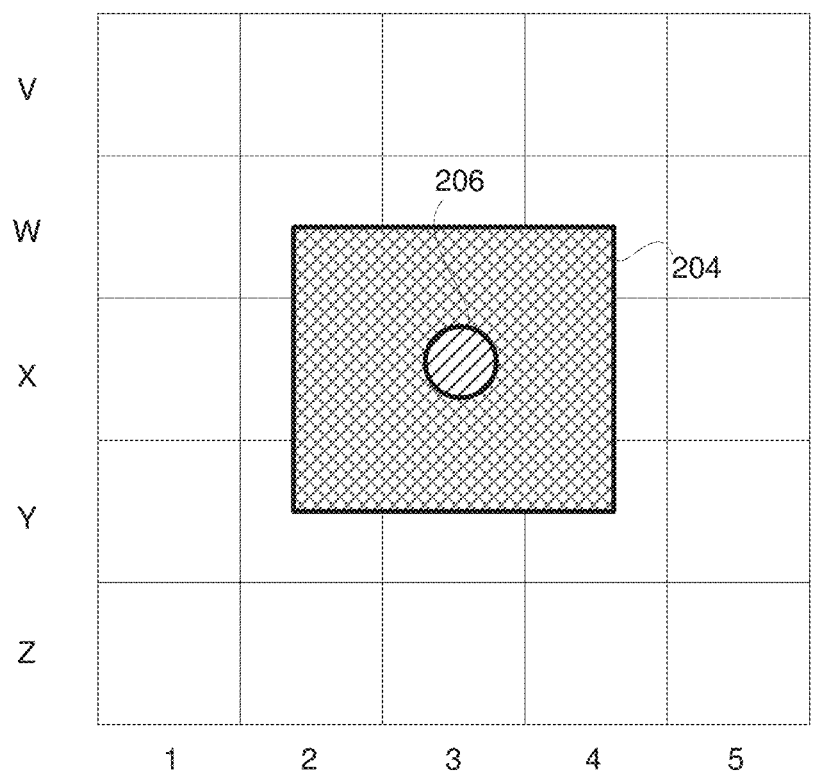
FIG. 2c shows the scene from the point of view of a light source.

FIG. 2b shows a top-down view of the scene in FIG. 2a. As shown, the light source is located on a line 207 that is perpendicular to the plane of wall 204 and passes through the centre of the wall 204. The centre of sphere 206 is located on line 207 and is located between the light source and wall 204. The light source may be a directional light source which casts parallel rays onto the scene. FIG. 2c shows the scene from the point from the point of view of the light source. The fragments that are visible in this scene indicate the fragments that have light incident on them. Thus the fragments that make up the parts of the front face of the wall 204 that are visible (i.e. not the part of the wall that is directly behind the sphere 206) and the front half of the sphere 206 have light incident on them. The depth values for each position of the screen space (e.g. for each pixel) is saved as the shadow map in memory 112. The depth values of pixel positions that do not contain any objects may be saved as having a background or default depth that corresponds to "very far away".

Step 2: Render the Scene from the Point of View of the Camera to Produce the Image That is to be Displayed.

At a stage in rendering the image (e.g., during shading) the shadow map produced in step 1 is examined to determine whether a pixel is in shadow or not.

At some stage in the render, a colour may be assigned to each pixel. For example, before considering whether a pixel is in shadow or not, the pixel may be determined to be bright red (255,0,0) (according to the RGB colour model). This may be the result of a conventional texturing operation. The pixel's location on the screen is known as is its depth in the scene from the Z-buffer: (x,y,d). The pixel location (x,y,d) is transformed from screen space into "light space", to find the position of the same point in the coordinate system that was used for the render in step (1): (X,Y,D). The transformation may be a geometrical calculation (matrix operation) based on the known relative positions and directions of the camera and the light. The light space coordinates (X,Y,D) indicates where, in an image rendered from the point of view of the light, the pixel is located and how far away from the light it is. The shadow map at coordinates (X,Y) is read to retrieve the previously saved depth value (S). If the depth S is smaller than depth D, then this indicates that there is something closer to the light which will cast shadow on the pixel. Otherwise the pixel is illuminated by the light. If the pixel is in shadow, the colour assigned to that pixel may be modified accordingly. For example, colour (255,0,0) may become (25,0,0). Other modifications to pixels in shadow may be performed, e.g. the shadowed pixels may simply be assigned as black (0,0,0).

In the illustrated example, the scene from the point of view of the camera is shown in FIG. 2a. FIG. 2b provides an illustration of the camera position. In FIG. 2a, the pixels for the portion of the wall 204 that is directly behind the sphere 206 from the point of view of the light source will be in shadow. Also, the pixels for the sphere 206 that are visible in the scene and behind the illuminated pixels of the sphere 206 from the point of view of the light source will also be in shadow.

A scene may have multiple light sources, each one casting a different shadow. In this case, the scene is rendered from each light source (e.g., as described in step 1) to produce multiple shadow maps. When the scene to be displayed is rendered, the shadows may be resolved in a single step 2). A pixel is transformed into each of the light spaces (for each light source) and each shadow map is read to determine whether the pixel is illuminated by that particular light. The colour of the pixel is then determined by an appropriate blend of the colour of the object with the colour of light from each of the sources that illuminates it.

Figure 3:
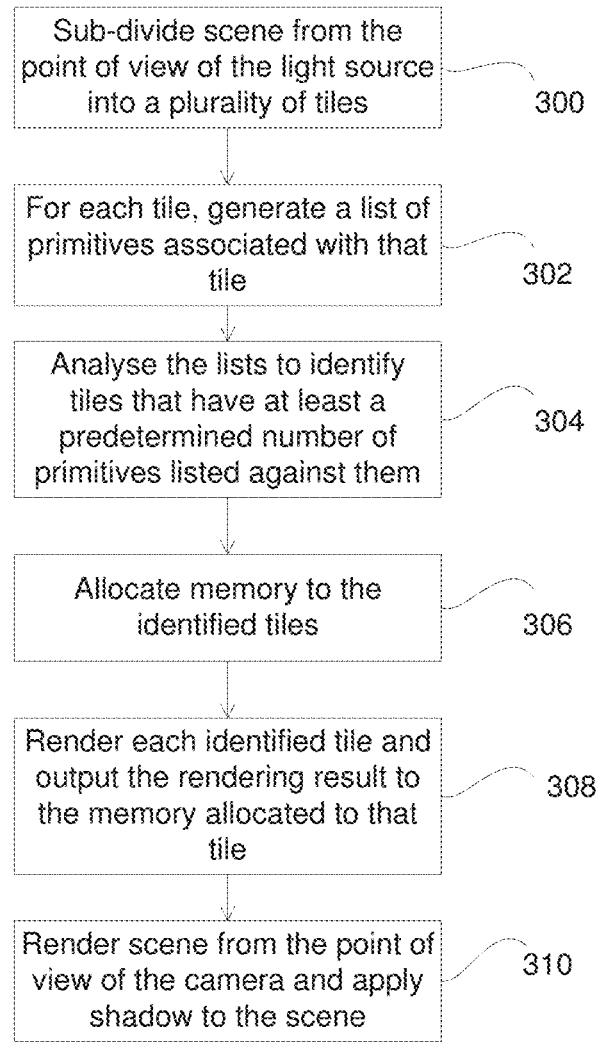
FIG. 3 is a flow chart for a method of applying shadows to a scene.

FIG. 3 illustrates a process for generating a shadow map (steps 300 to 308) and applying shadow to a scene using the generated shadow map at system 100 (step 310). The process described at steps 300 to 308 is not limited to rendering a scene to a texture for shadow mapping and could be used to render a scene to any suitable render target for other purposes.

At step 300, a scene from the point of view of a light source (as described at step 1 above) is tiled into a plurality of tiles by the tiling unit 106. In the illustrated example, FIG. 2c shows the scene from the point of view of the light source tiled into twenty-five tiles.

At step 302, a display list for each tile is generated during tiling and saved at memory 112, as described above. In the illustrated example, tiles W2 to W4, X2 to X4 and Y2 to Y4 will have primitives listed against them and tiles V1 to W1, W5, X1, X5, Y1 and Y5 to Z5 will have zero primitives listed against them.

The tiling process provides an opportunity to examine the contents of the display lists before rendering each tile. The display lists indicate which tiles have no primitives in them, i.e. no shadow casting objects. Therefore it is possible to identify, without performing the render, that the shadow map will be empty (or contain a value representing "very far away") for those tiles.

At step 304, the display lists are analysed to identify tiles that have at least a predetermined number of primitives associated with them so that only those tiles are rendered to generate the shadow map. In one example, the predetermined number may be one. In this example, tiles that do not have any primitives associated with them (i.e. tiles that have zero primitives listed against them) are identified so that they can be ignored for the subsequent render to generate the shadow map. This has a number of advantages such as: i) reducing the amount of memory that needs to be allocated for the shadow map (as described further below); ii) reducing the number of tiles that need to be rendered and therefore increasing the speed at which the shadow map is generated. In another example, the tile lists may be analysed to determine which tiles contain significant shadow casting primitives. Shadow casting primitives may be determined to be insignificant if they cover only a single sample point in the tile, if they cover only a small number of sample points in the tile, or if the aspect ratio of the covered area of the tile is above a threshold (e.g., such that very thin objects can be deemed to be insignificant). Such primitives may, for example, represent very small objects, or, at the edge of a tile, may represent the edges of objects that are primarily present in other tiles. Tiles that do not contain any significant shadow casting objects can be ignored. While ignoring potential shadow casting objects may be seen as introducing errors into the shadow map, it must be remembered that shadow map resolution is often limited, and objects that occupy only a small area of the shadow map may cast poorly defined or visually inaccurate shadows into the rendered scene. It may therefore be the case that omitting these objects from the shadow map render improves the visual quality of the rendered scene, as well as having the advantages stated above, of improving the efficiency of the shadow map render. Similarly, omitting parts of primitives representing object edges removes shadow map data in regions (i.e. at shadow edges) that are already prone to inaccuracies, and where measures to conceal these inaccuracies may already be in use. The number of sample points covered by a primitive or group of primitives may be calculated or estimated by geometry processing steps that precede tiling unit 106, or that may already be performed as part of the tiling process in tiling unit 106.

In another example, the predetermined number may be greater than one (e.g. three). In this example, tiles containing relatively small and insignificant shadow casting objects may be ignored in the subsequent render for generating the shadow map. This may further reduce the amount of memory that needs to be allocated and the number of tiles that need to be rendered to generate the shadow map.

In another example, a predetermined number of primitives greater than one may be combined with an analysis of the number of sample points covered by those primitives, such that the significance of shadow casting objects in a tile is determined both from the number of primitives, and the amount of the tile that each one covers. This may reduce the amount of memory that needs to be allocated and the number of tiles that need to be rendered to generate the shadow map, while also preserving shadow map accuracy in areas where a small number of primitives cover a significant proportion of a tile.

The tile lists may be analysed by the graphics processor 102 or the processing unit 104 or any other processor which has access to memory 112.

In the illustrated example shown in FIG. 2c, tiles W2 to W4, X2 to X4 and Y2 to Y4 will be identified from the display lists as being associated with at least one primitive. The remaining tiles have no primitives listed against them and so they will not be identified for further rendering and so they may be ignored.

At step 306, memory is allocated for each of the identified tiles by the MMU 110. Each tile may be allocated a portion or block of memory. For example, memory may be allocated in pages, with the MMU 110 controlling the allocation and mapping of pages.

A shadow map may be considered, conceptually, to be a solid block of memory, with, for example, one page per tile or group of tiles. For example, a 4 KB memory page may correspond to one 32×32 pixel tile having a 32 bit depth value for each pixel. If a different tile size was used, for example, a 16×16 pixel tile, the 4 KB page of memory may be allocated to four adjacent tiles in a 2×2 group.

Conventionally, the render of a shadow map would allocate memory for the whole shadow map and then render into it (which would be a tile at a time in tile based graphics systems). The memory would usually be allocated in advance of tiling the scene from the point of view of the light source. Allocating memory for the whole shadow map in advance means that all areas of the shadow map are allocated memory, even areas that do not contain any (or insignificant) shadow casting objects. In the presently disclosed process and system, the MMU 110 may be configured to allocate memory after tiling the scene from the point of view of the light source. This allows the display lists to be analysed before allocating memory for the shadow map. The display lists are analysed to identify the tiles that have at least, e.g., one primitive associated with them. Only the identified tiles are allocated memory by the MMU 110 and the tiles that do not have any primitives associated with them (i.e. the unidentified tiles) may not be allocated any memory. Thus, the amount of memory allocated for the shadow map can be reduced.

For example, the scene shown in FIG. 2c would, conventionally, be allocated memory for all twenty-five tiles V1 to Z5. In the present system, the MMU 110 allocates memory only for the tiles identified in step 304. Thus memory would be allocated for nine tiles only (tiles W2 to W4, X2 to X4 and Y2 to Y4) rather than twenty-five. The tiles that are not identified (tiles V1 to W1, W5, X1, X5, Y1 and Y5 to Z5) may be ignored and so they are not allocated any memory. Thus, only the identified subset of tiles are allocated memory, which can lead to a reduction in the amount of memory required for the shadow map.

The memory seen by the graphics processor 102 may be virtual memory, where the addresses that the graphics processor 102 works with are mapped onto actual physical addresses of memory 112 by the MMU 110. The mapping may be on a page by page basis. An apparently contiguous block of virtual memory may be pieced together from physical memory pages at different locations that may not necessarily be contiguous, or in the same order. Physical memory allocation may happen at different stages. For example, a block of virtual memory may be assigned to the whole shadow map, but physical memory backing is only provided by the MMU 110 to the identified tiles where, or when, it is needed. In the illustrated example, the MMU 110 may generate a page table that has virtual addresses for each of the tiles V1 to Z5 but only maps virtual addresses for tiles W2 to W4, X2 to X4 and Y2 to Y4 to physical addresses. The virtual address for tiles V1 to W1, W5, X1, X5, Y1 and Y5 to Z5 may be unmapped or mapped to a single physical address having a default or "background" value.

At step 308, the tiles identified in step 304 are rendered. The tiles may be rendered a tile at a time. The data resulting from the render (e.g., pixel depth values) of each tile is written to the memory address allocated for that tile. If the memory address is a virtual address, the MMU 110 translates that address into the physical address at memory 112.

In this example, only the tiles identified in step 304 are rendered. Thus, the tiles that are not identified (tiles V1 to W1, W5, X1, X5, Y1 and Y5 to Z5) are not rendered, which saves on the processing overhead for rendering those tiles. For tiles that are empty, some graphics processors may generate a default or background value which may still be written to memory. However, by not rendering those tiles, no data associated with those tiles are written out to memory, thus saving memory for other uses.

For scenes that comprise more than one light source, steps 300 to 308 may be repeated for each light source.

At step 310, the scene from the point of view of the camera is rendered (i.e. step 2, described above). The scene from the point of view of the camera may be tiled by the tiling unit 106 and rendered a tile at a time by the rendering unit 108. During this render, the rendering unit 108 queries the shadow map (or maps) at coordinates (X,Y) to retrieve a depth value (S) for those coordinates in order to determine if a pixel is in shadow or not, as described above. Pixels that are determined to be in shadow will be modified accordingly. For example, the texture processor 116 may modify a pixel depending on other light sources, shadow colour, blur values, etc.

If the shadow map is queried at a coordinate (X,Y) that corresponds to an empty tile (i.e. the unidentified and unallocated tiles), the MMU 110 may be configured to return a default or background depth value S corresponding to "very far away" for any attempted access to those pages. Thus, the pixel corresponding to that coordinate will be illuminated by the light source as it will have depth value that is smaller than S. The default depth value may be stored at a single memory location which the MMU 110 maps all of the unidentified tiles to.

Figure 2D:
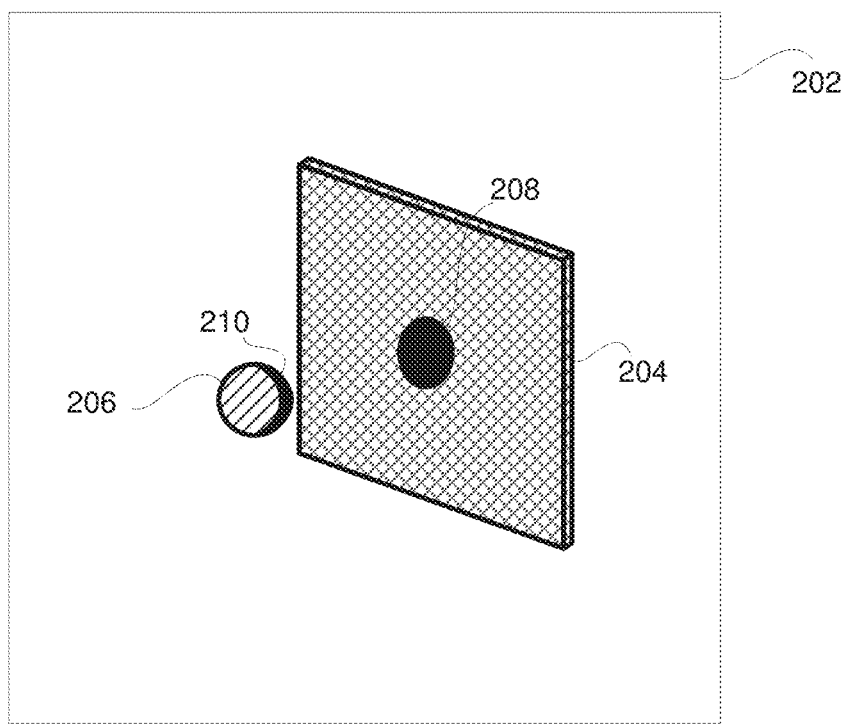
FIG. 2d shows the scene with the shadow applied from the camera point of view.

Each rendered tile may then be output to a display buffer (which may be via further processing blocks that are not shown in FIG. 1). FIG. 2d shows the final scene to be displayed with shadow applied (at 208 and 210) to the scene.

The process of FIG. 3 provides memory and memory bandwidth savings for the shadow map by only allocating memory to tiles that have shadow casting objects within them. This is achieved by analysing the display lists generated by tiling to identify which tiles have primitives in them and only allocating memory for those identified tiles. The tiles are then rendered to generate the shadow map. In an alternative embodiment, memory may be allocated for the shadow map after the render of a tile. In this embodiment, the tiling unit 106 tiles a scene from the point of view of a light source into a plurality of tiles, as described above. Each tile is then rendered in turn by the rendering unit 108. When the rendering unit 108 renders a tile that contains an object, it determines depth values corresponding to the object and attempts to write those values to memory. At this stage, memory has not been allocated for the tile. The MMU 110 may detect the attempted access to memory, trap the access, and allocate the physical memory at that point. The MMU 110 may then release the access so that the rendering unit 108 can write the values for the tile to the allocated memory. When the rendering unit 108 renders tiles that do not contain any objects, the rendering unit 108 may not output any depth values for those tiles. Thus, the MMU 110 will not detect any attempted access by the rendering unit 108 to the memory 112 for tiles that do not contain any objects. Therefore, no memory will allocated for those tiles and only tiles that have objects in them will be allocated memory. Thus, in this alternative embodiment, the amount of memory allocated for the shadow map is reduced without having to analyse any display lists.

Figure 4A:
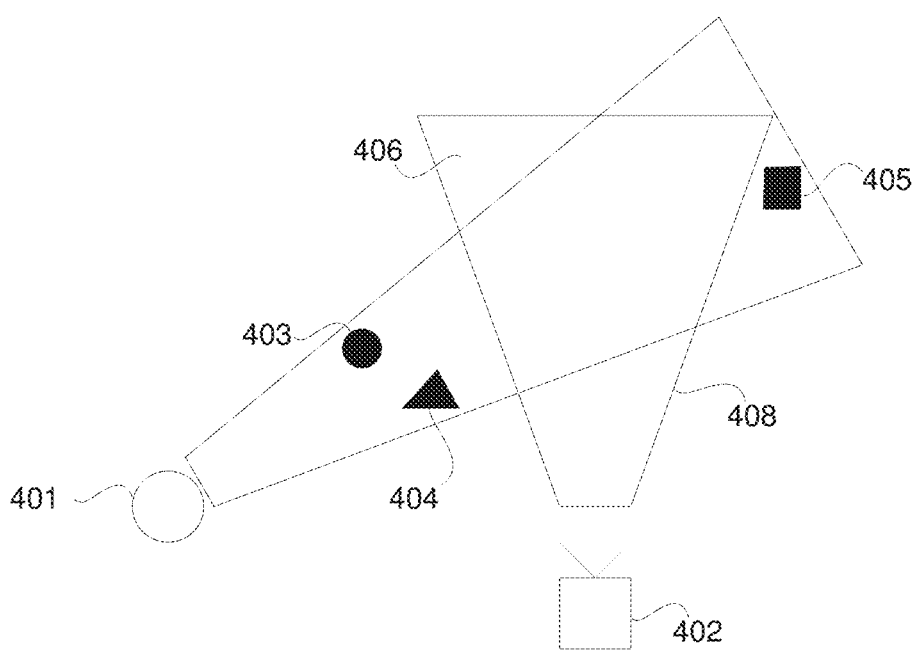
FIG. 4a shows a top-down representation of another scene.
Figure 4B:
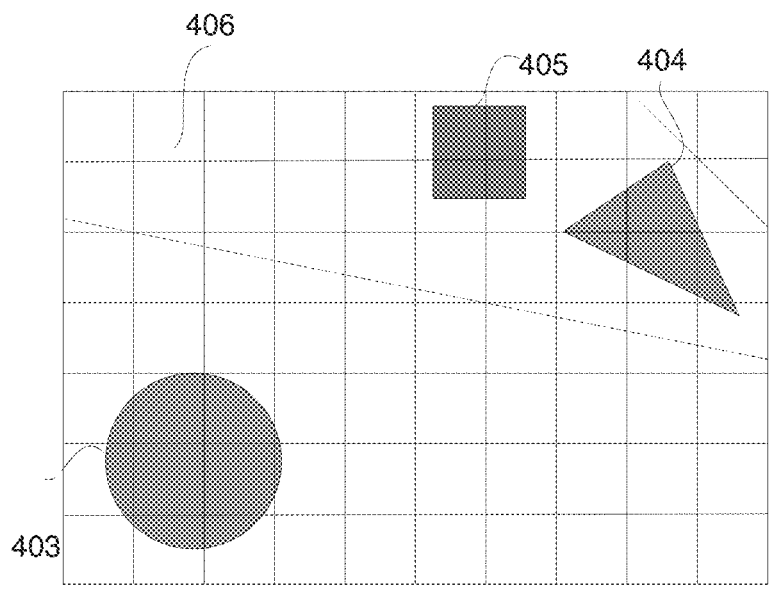
FIG. 4b shows the scene from the point of view of a light source.
Figure 4C:
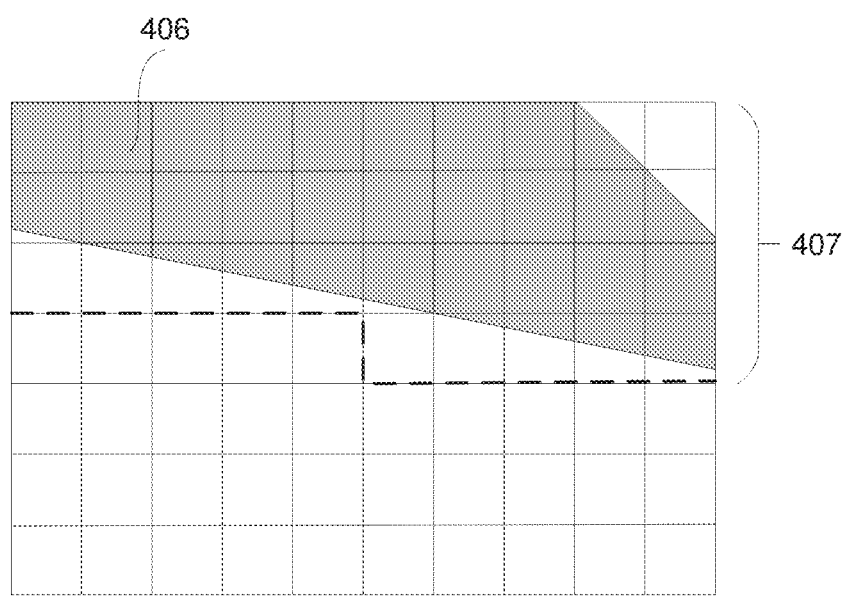
FIG. 4c shows a camera frustum as seen from the point of view of the light source.

FIGS. 4a-c illustrate another technique for identifying tiles that can be omitted or ignored when generating a shadow map. This technique may be applied in addition to or independently of the techniques described above.

A tile of the shadow map may contain primitives, i.e. shadow casting objects, but if no part of the frustum of the camera view rendered in step 2 (described above) is visible in that tile, then those objects will never cast their shadows onto anything seen by the camera. Thus, these tiles may be ignored when generating the shadow map as any objects in those tiles will not affect the scene viewed by the camera.

FIG. 4a illustrates a plan view of a scene. The light and camera positions for the scene are indicated at 401 and 402 respectively. Objects such as sphere 403, pyramid 404 and cube 405 are objects which may, potentially, cast shadows. A view frustum of the camera is illustrated at 406. The view frustum 406 may be considered to be a region of space in a 3D modelled world that may appear on screen and is considered to be the field of view of the camera.

Objects between the light 401 and the camera frustum 406 could potentially cast a shadow on to other objects (not shown for simplicity) in the camera frustum 406. FIG. 4b shows the view of the scene from the point of view of the light 401. A part of the camera frustum 406 is also viewable from the light 401. The extents of the viewable camera frustum 406 are indicted by the dashed line. As shown, pyramid 404 and cube 405 are objects that lie within the extents of the camera frustum 406, as seen from the light 401. Thus, from this point of view, the pyramid 404 and cube 405 are objects that could potentially cast a shadow that may affect the scene seen by the camera 402. Sphere 403 cannot cast shadows into the scene seen by the camera 402 because the light rays passing through the area of that objects would not have been able to interact with the camera's view frustum 406. Thus, a region in the light's view can be identified that may affect the scene seen by the camera 402.

FIG. 4c indicates the region 406 which may affect the scene seen by the camera 402. This region may be considered to be the camera frustum 406 viewable from the point of view of the light 401. Any objects in areas outside of this region 406 may not affect the scene seen by the camera 402. The set of tiles that comprise this region are indicated at 407. Thus, when generating a shadow map, the rendering of objects outside of region 406 may be ignored because those objects won't affect the scene to be displayed. This can provide processing and memory savings when generating and storing a shadow map in a manner similar to the savings described above.

In one example embodiment, region 406 may be identified by determining the positions of the extents of the camera frustum 406 and transforming those positions into "light space" to locate those same positions from the point of view of the light. Thus, the position of the camera frustum 406 from the point of light 401 can be determined. The tiling unit 106 may tile the scene from the point of view of the light, as described previously. From the determined position of the frustum 406, the processing unit 104 (or the graphics processor 102) may determine which tiles contain the frustum 406. These tiles are indicated by the block of tiles 407 in FIG. 4c. Only those determined tiles 407 may be selected for rendering by the rendering unit 108. Similarly to above, only those tiles 407 may be allocated memory by the MMU 110.

In another example embodiment, a model of the camera frustum 406 (as it would be positioned in the 3D world of the scene) may be generated and used to determine which parts of the scene from the point of view of the light source may affect the camera scene. The camera frustum 406 may be modelled to form a frustum model object (made up of primitives) that has the same geometry and same positioning as the camera frustum 406. The object thus represents the camera frustum 406. The processing unit 104 may generate graphics data for the object which is provided to the graphics processor 102. The tiling unit 106 may receive the graphics data for the frustum model object and tile a scene from the point of view of the light 401. This would lead to a tiled scene that looks like FIG. 4c. The model of the camera frustum from the point of view of the light is shown at 406. As shown in FIG. 4c, some tiles are empty, while others contain the frustum 406. A shadow casting object in an empty tile may not cast shadows into the scene seen by the camera because light rays passing through that tile do not interact with the camera's view frustum 406. Thus the empty tiles cannot affect the scene, regardless of whether they will contain any shadow-casting objects. The tiles containing the frustum 406 are identified. These tiles are generally indicated at 407, which is a set of tiles which may affect the scene. The tiling unit 106 may generate tile lists which sorts the primitives of the frustum model 406 into per-tile lists (in, e.g., the manner described above). The processing unit 104 may then analyse the lists (e.g., as described above) to identify the tiles 407 that contain the frustum 406. Next, the normal scene (containing the sphere 403, pyramid 404 and cube 405) from the point of view of the light may be tiled for generating a shadow map. When generating the shadow map, only the tiles corresponding to the identified tiles 407 containing the frustum 406 are rendered because only those tiles contain parts of the shadow map that may potentially affect the final scene to be displayed. The other tiles may be ignored. Similarly to above, only the tiles that are going to be rendered need to be allocated memory and the tiles that are not rendered may not be allocated any memory.

The technique could be performed in a single step, e.g. by using the frustum model 406 to set up a stencil buffer (not shown). The stencil buffer may form part of the graphics processor pipeline. The stencil buffer may reject any objects that are not within the stencil region and thus only tiles within the stencil region (i.e. the tiles corresponding to the frustum 406) are rendered and/or allocated memory.

Alternatively, the graphics processor may provide a facility to specify clipping (also known as culling) planes. The technique may then be performed by setting up clipping planes corresponding to the geometry of the frustum model 406. Clipping typically operates at a point in the pipeline prior to tiling unit 106 such that objects outside the frustum region would be rejected and not added to tile lists. Thus, only tiles within the frustum region 407 would be rendered and/or allocated memory.

The technique of determining the parts of the shadow map that will affect the scene to be displayed may be combined with the above-described technique of only rendering (and/or allocating memory for) tiles that contain shadow-casting objects. Thus, a tile may only be rendered and/or allocated memory for the shadow map if the frustum 406 is visible in the tile and there is a shadow casting object in the tile. Such tiles may be identified, for example, by comparing the tile list generated when tiling the model of the frustum with the tile list generated when tiling the scene. In this example, only the tiles that contain the pyramid 404 and cube 405 are identified for rendering/memory allocation.

In a further enhancement, the plane or planes 408 that comprise the back face of the camera frustum 406 as viewed from the light may be identified. Objects beyond this plane (such as cube 405) may be clipped early in the process of generating the shadow map as such objects will not affect the scene seen by the camera 402. For example, the processing unit 104 may determine the location of the plane 408 of the camera frustum 406. The processing unit 104 or tiling unit 106 may then clip any objects that are located further from the plane 408 location from the point of view of the light. Thus, with this enhancement, the cube 405, which, as shown, is beyond the frustum 406, will be clipped. Thus, when the scene from the point of view of the light 401 is tiled, the cube 405 will not be present and so only the tiles containing the pyramid 404 will be rendered and/or allocated memory. Such clipping may be performed at an early stage in any of the shadow mapping processes described above.

Identifying empty tile lists allows all rendering to be avoided (potentially a large amount of potentially shadow-casting geometry) for tiles outside camera frustum region 406. The tiling unit 106 may be configured to discard objects early and/or avoid building tile lists for tiles that are outside of the camera frustum region 406 to provide further graphics processing savings.

The graphics processor 102 may be implemented in hardware. When implemented in this way, compilation of the display lists by the tiling unit 106 is cheap to perform. The display lists indicate which tiles in a scene from the point of view of a light source have shadow casting objects in them and so it provides a cheap and efficient method of determining which regions in the scene are to be rendered and allocated memory for a shadow map.

The system of FIG. 1 is shown as comprising a number of functional blocks. This is schematic only and is not intended to define a strict division between different logic elements of such entities. Each functional block may be provided in any suitable manner.

The graphics processing systems described herein may be embodied in hardware on an integrated circuit. The graphics processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a graphics processing system configured to perform any of the methods described herein, or to manufacture a graphics processing system comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing system will now be described with respect to FIG. 5.

Figure 5:
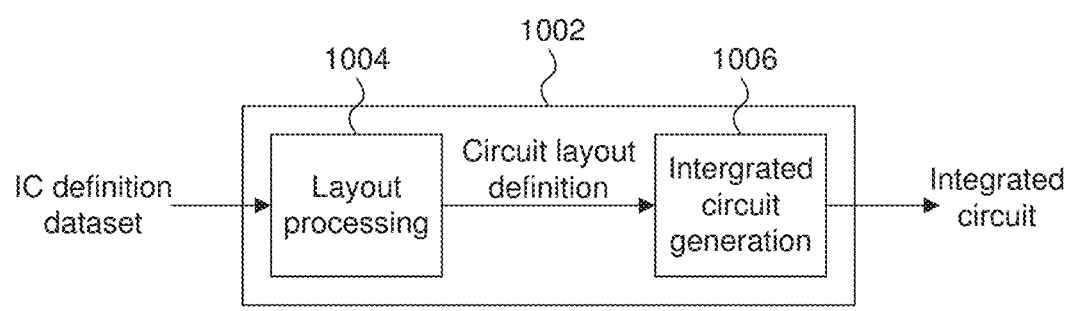
FIG. 5 is a schematic diagram of an integrated circuit manufacturing system.

FIG. 5 shows an example of an integrated circuit (IC) manufacturing system 1002 which comprises a layout processing system 1004 and an integrated circuit generation system 1006. The IC manufacturing system 1002 is configured to receive an IC definition dataset (e.g. defining a graphics processing system as described in any of the examples herein), process the IC definition dataset, and generate an IC according to the IC definition dataset (e.g. which embodies a graphics processing system as described in any of the examples herein). The processing of the IC definition dataset configures the IC manufacturing system 1002 to manufacture an integrated circuit embodying a graphics processing system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 5 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 5, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A graphics processing system comprising:
   a processing unit configured to receive a plurality of primitives representative of a first view of a scene and identify a first subset of primitives of the plurality of primitives that are associated with a region of the scene that is viewable in a second view, wherein:
      the region of the scene that is viewable in the second view is a view frustum of the second view; and
      the first subset of primitives are identified in dependence on determining the position of the view frustum of the second view from the first view; and
   a rendering unit configured to render each primitive of the first subset of primitives.

2. The graphics processing system as claimed in claim 1, wherein the graphics processing system is configured to generate a render output for use in a subsequent render, and the rendering unit is configured to render each primitive of the first subset of primitives to the render output.

3. The graphics processing system as claimed in claim 2, wherein the second view is a point of view of the subsequent render.

4. The graphics processing system as claimed in claim 2, wherein the render output is a shadow map texture.

5. The graphics processing system as claimed in claim 2, wherein the render output is a texture and the rendering unit is configured to apply the texture to the scene in the subsequent render of the scene.

6. The graphics processing system as claimed in claim 1, wherein the first view is a point of view of a light source.

7. The graphics processing system as claimed in claim 1, wherein the plurality of primitives are a plurality of object primitives that represent at least one object in the scene.

8. A graphics processing system comprising:
   a processing unit configured to receive a plurality of primitives representative of a first view of a scene and identify a first subset of primitives of the plurality of primitives that are associated with regions of the scene that are viewable in a second view, wherein the first subset of primitives are identified in dependence on a frustum model comprising further primitives representing a view frustum of the second view; and
   a rendering unit configured to render each primitive of the first subset of primitives.

9. The graphics processing system as claimed in claim 8, wherein the graphics processing system is configured to generate a render output for use in a subsequent render, and the rendering unit is configured to render each primitive of the first subset of primitives to the render output.

10. The graphics processing system as claimed in claim 9, wherein the second view is a point of view of the subsequent render.

11. The graphics processing system as claimed in claim 9, wherein the render output is a shadow map texture.

12. The graphics processing system as claimed in claim 9, wherein the render output is a texture and the rendering unit is configured to apply the texture to the scene in the subsequent render of the scene.

13. The graphics processing system as claimed in claim 8, wherein the first view is a point of view of a light source.

14. The graphics processing system as claimed in claim 8, wherein the plurality of primitives are a plurality of object primitives that represent at least one object in the scene.

15. A graphics processing system comprising:
a processing unit configured to:
- receive a plurality of primitives representative of a first view of a scene;
- identify primitives that are further, from a point of view for the first view, than a or the plane comprising the back face of a view frustum for a second view;
- clip the identified primitives from the scene; and
- identify a first subset of primitives that are associated with regions of the scene that are viewable in the second view; and a rendering unit configured to render each primitive of the first subset of primitives.

16. The graphics processing system as claimed in claim 15, wherein the graphics processing system is configured to generate a render output for use in a subsequent render, and the rendering unit is configured to render each primitive of the first subset of primitives to the render output.

17. The graphics processing system as claimed in claim 16, wherein the second view is a point of view of the subsequent render and the first view is a point of view of a light source.

18. The graphics processing system as claimed in claim 16, wherein the render output is a texture and the rendering unit is configured to apply the texture to the scene in the subsequent render of the scene.

19. The graphics processing system as claimed in claim 15, wherein the plurality of primitives are a plurality of object primitives that represent at least one object in the scene.

20. The graphics processing system as claimed in claim 15, wherein the first subset of primitives are associated with regions of the clipped scene that are viewable in the second view.

* * * * *